UNITED STATES PATENT OFFICE.

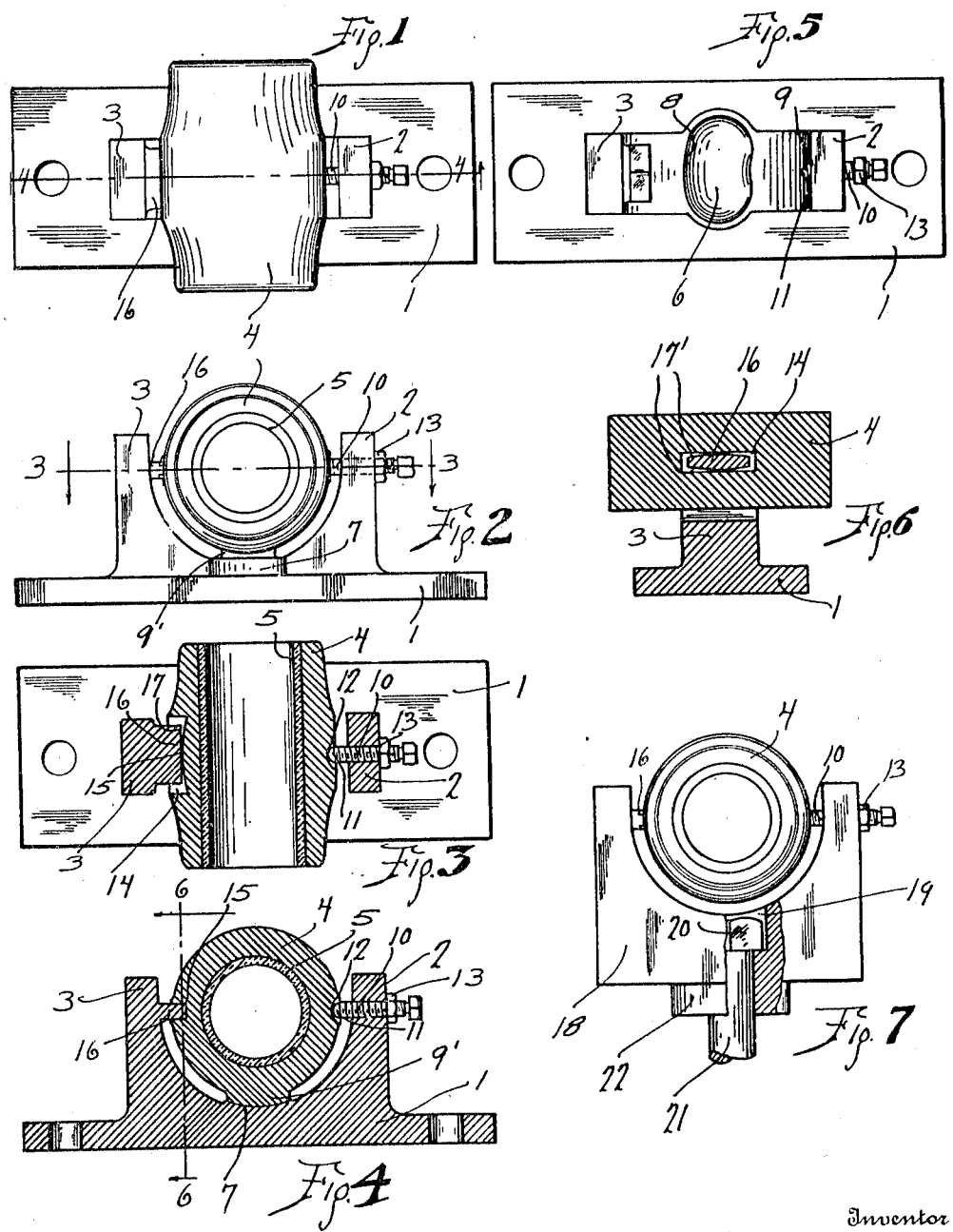

ARTHUR R. BLEWETT, OF SPOKANE, WASHINGTON.

BEARING-BOX.

1,118,325.  Specification of Letters Patent.  Patented Nov. 24, 1914.

Application filed January 15, 1914. Serial No. 812,288.

*To all whom it may concern:*

Be it known that I, ARTHUR R. BLEWETT, a citizen of the United States, residing at Spokane, in the county of Spokane and State of Washington, have invented new and useful Improvements in Bearing-Boxes, of which the following is a specification.

The object of this invention is to provide a journal box having a limited universal movement, the device of my invention having special utility in supporting shafts of mechanism mounted upon running gear, such for instance as threshing machines where the torsional strains due to flexure of the supporting frame frequently causes journals and shafts to bind in their bearings.

A very special feature resides in the provision of a journal box, which not only is capable of universal movement, to a limited degree, but which is supported structurally in a manner to permit of such universal movement without throwing the weight on portions which afford such universal movement, thereby relieving such portions of any and all strains excepting those which would be imposed upon any form of guiding devices.

Other features and objects of the invention will be more fully described in connection with the accompanying drawing, and will be more particularly pointed out and ascertained in and by the appended claims.

In the drawings:—Figure 1 is a plan view illustrative of a box embodying one form of my invention. Fig. 2 is an end view thereof. Fig. 3 is a sectional view on line 3—3 of Fig. 2. Fig. 4 is a sectional view on line 4—4 of Fig. 1. Fig. 5 is a view of the base structure or mounting of the journal box with the latter omitted. Fig. 6 is a sectional view on line 6—6 of Fig. 4. Fig. 7 is a view in end elevation, partly broken away, of a modified form of my invention.

Like characters of reference designate similar parts throughout the different figures of the drawing.

As illustrated, 1 designates a base from which guiding uprights 2 and 3 extend. A journal or bearing box is indicated at 4 and may be babbeted in the usual manner as shown at 5. The base 1 is provided with a box supporting portion 6, which is shown in the form of a hollowed out portion or cavity which may be formed in an elevated portion 7 of the base. The supporting cavity 6 is arced, as at 8 on a center which is indicated at 9, and the cavity 6 is somewhat elongated to permit of a relatively limited shifting movement therein of a bearing box shoe, which will presently be described. The bearing box 4 is provided with a shoe 9′ having a bottom face shaped to conform to the rounded supporting face of the cavity 6, and I preferably arc the cavity 6 and the shoe 9′ concentrically with the axis of the bore of the bearing box 4, both longitudinally and transversely, although it may be stated that longitudinally, the cavity 6 may be somewhat flattened with respect to a true arc having a center coincident with the bore of the bearing 4. The cavity 6 and shoe 9′ function primarily as a structural support for the bearing 4 irrespective of the position which the latter may take within the limited range of movement provided therefor. As hereinbefore stated, the bearing box 4 has coacting devices for guiding and limiting movement thereof. One of the guiding devices comprises in part, a bolt 10 which extends through guiding upright 2 and which has a guiding terminal 11 adapted to seat in a guiding recess 12, formed in the box 4. The point of contact of the terminal 11 with the recess 4 forms a center about which the box 4 may turn horizontally. A lock nut 13 may be provided to hold the bolt 10 in a set position.

Opposite the recess 12, the box 4 is provided with a guiding socket 14 having a bottom wall 15 which is arced on a center coincident with the terminal 11, as indicated at 9. Upright 3 is provided with a guiding lug 16, which projects into the socket 14 into engagement with the bottom wall 15 thereof and which is arced on a greater radii than that of the bottom wall 15, as indicated at 17. Longitudinally and transversely of the open front of the socket, the same is rectangular, as clearly indicated in Fig. 6. The guiding lug 16 is transversely rounded, on its upper and lower faces, as indicated at 17′, in Fig. 6.

It will now be seen that the bearing box 4 may tilt on its support 6 about an axis transverse to its longitudinal axis, with one of its ends moving upwardly and the other of its ends moving downwardly. Furthermore, the bearing box 4 may shift about a vertical axis intersecting point 9, or in other words, the terminal 11. Thus it will be seen that a relatively limited shifting movement is afforded which amounts to universal movement for the reason that the bearing box may play in any of the directions which would be necessary to accommodate for any shifting movement which a journal might require.

The form shown in Figs. 1 to 6, is particularly adapted for journaling shafts which are under a heavy load, but in Fig. 7 I have shown a modified form of the invention which is highly efficient for shafts under a light load.

Referring to Fig. 7, 18 designates a mounting for the journal box 4, and the latter is mounted on devices similar to those functioning as guiding devices in the preferred construction, and therefore the same need not to be again described in detail except that it may be stated that these guiding portions, in the form shown in Fig. 7, also function as supporting portions.

The mounting 18 is recessed at 19 to provide a seat for a bolt head 20, of a bolt 21. The bolt 21 extends downwardly through an extension 22 and serves to swivel the mounting 18. The extension 22 is preferably circular and is adapted to seat in a similarly formed socket of a base adapted to support the mounting 18, and not herein shown.

It is believed that the advantages and utility of my invention will be fully understood from the foregoing description, and while I have herein shown and described one specific form of my invention, I do not wish to be limited thereto except for such limitations as the claims may import.

I claim:—

1. In a journal bearing structure, a bearing box for the journal, a mounting having a portion engaging the bottom of said box to slidably and structurally support the same, a pivot device engaging one side of the box, and a sliding guiding device engaging the other side of the box and being arced about said pivot device as a center to permit of horizontal movement of the box about said pivot guiding device, substantially as described.

2. In a journal bearing structure, a bearing box for the journal having a pivot cavity on one side and a guiding socket on the other side provided with a bottom wall arced about a center coincident with said cavity, a pivot guiding device engaging said pivot cavity, a sliding guiding device projecting into said socket and havng an end arced about said pivot device as a center for engagement with the arced bottom wall of said socket, substantially as described.

3. In a journal bearing structure, a bearing box for the journal having a pivot cavity on one side and a rectangular socket on the other side provided with a bottom wall arced about said cavity as a center, a pivot guiding device engaging said pivot cavity, and a lug guiding device engaging said socket and having an arced end engaging the arced bottom wall of said socket, and said lug being arced transversely for engagement with rectangular walls of said socket, substantially as described.

4. In a journal bearing structure, a bearing box for the journal, a pivot guiding device engaging the box on one side, a sliding guiding device engaging the box on the other side, and a supporting device engaging the bottom of the box and having an engaging surface arced about a center with a radius substantially equal to the distance between said pivot device and the longitudinal axis of said box for horizontal shifting movement of the box about said pivot device as a center, substantially as described.

5. In a journal bearing structure, a bearing box for the journal, a mounting having a supporting cavity arced about the journal axis of the box as a center, said mounting having a pivot device coacting with the box at one side thereof on a horizontal line with the journal axis of said box, said cavity being arced horizontally about a center with a radius substantially equal to the distance between said pivot device and the journal axis of said box for horizontal movement of the latter in directions angular to the normal journal axis, and said mounting having a guiding device coacting with said box on that side thereof opposite said pivoted side, substantially as described.

6. In a journal bearing structure, a bearing box for the journal, a mounting having a supporting cavity concentric with respect to the journal axis of said box and arced about a center lateral with respect to the journal axis for limited shifting movement of the box horizontally and tilting movement vertically, and said mounting including devices for guiding the box during such shifting and tilting movement, substantially as described.

7. In a journal bearing structure, a bearing box for the journal, and a mounting having means below the box for supporting the latter during bodily horizontal shifting and tilting movement thereof, and devices for guiding the box during such horizontal shifting and vertical tilting movements, substantially as described.

8. In a journal bearing structure, a bearing box for the journal, and a mounting having means engaging the bottom of the box to support the same during bodily horizontal shifting and vertical tilting movement thereof, and devices engaging the sides of the box at horizontal points opposite the journal axis of the latter for guiding the box during such horizontal shifting and vertical tilting movements thereof, substantially as described.

In testimony that I claim the foregoing as my own, I hereby affix my signature in the presence of two subscribing witnesses.

ARTHUR R. BLEWETT.

Witnesses:
GRACE TAYLOR,
HAROLD C. HODGKINS.

Copies of this patent may be obtained for five cents each, by addressing the "Commissioner of Patents, Washington, D. C."